United States Patent
Mouhouche

(10) Patent No.: US 8,880,064 B2
(45) Date of Patent: Nov. 4, 2014

(54) METHOD FOR CONTROLLING THE POWER FOR BROADCASTING A COGNITIVE PILOT CHANNEL

(75) Inventor: Belkacem Mouhouche, Massy (FR)

(73) Assignee: Nec Corporation, Tokyo (JP)

( * ) Notice: Subject to any disclaimer, the term of this patent is extended or adjusted under 35 U.S.C. 154(b) by 390 days.

(21) Appl. No.: 13/318,885

(22) PCT Filed: May 6, 2010

(86) PCT No.: PCT/JP2010/003107
§ 371 (c)(1),
(2), (4) Date: Jan. 30, 2012

(87) PCT Pub. No.: WO2010/128594
PCT Pub. Date: Nov. 11, 2010

(65) Prior Publication Data
US 2012/0122412 A1    May 17, 2012

(30) Foreign Application Priority Data
May 7, 2009 (EP) .................................. 09159632

(51) Int. Cl.
H04B 17/00 (2006.01)
H04W 4/00 (2009.01)
H04B 7/00 (2006.01)
H04W 52/32 (2009.01)
H04W 48/10 (2009.01)

(52) U.S. Cl.
CPC .......... *H04W 52/322* (2013.01); *H04W 52/325* (2013.01); *H04W 48/10* (2013.01)
USPC ........... 455/434; 455/522; 455/69; 455/67.11

(58) Field of Classification Search
CPC ................................................. H04W 48/10
USPC ......................................... 455/522, 69, 127.1
See application file for complete search history.

(56) References Cited

U.S. PATENT DOCUMENTS

| | | | |
|---|---|---|---|
| 8,427,988 B2 * | 4/2013 | Pelletier et al. | 370/311 |
| 2006/0199546 A1 | 9/2006 | Durgin | |
| 2008/0070585 A1 | 3/2008 | Wu et al. | |
| 2009/0046667 A1 * | 2/2009 | Pelletier et al. | 370/335 |
| 2009/0298522 A1 * | 12/2009 | Chaudhri et al. | 455/509 |
| 2013/0203424 A1 * | 8/2013 | Van Phan et al. | 455/448 |
| 2013/0235830 A1 * | 9/2013 | Pelletier et al. | 370/329 |

FOREIGN PATENT DOCUMENTS

CN        101075830 A    11/2007

OTHER PUBLICATIONS

International Search Report dated for Aug. 11, 2010.
"Reconfigurable Radio Systems (RRS); Cognitive Pilot Channel", Draft ETSI TR 102 683 V0.0.9, May 2009, pp. 1-34.

(Continued)

*Primary Examiner* — Tilahun B Gesesse
(74) *Attorney, Agent, or Firm* — Sughrue Mion, PLLC

(57) ABSTRACT

The invention relates to a method for controlling the power for broadcasting a Cognitive Pilot Channel broadcasting lists of information to each of a plurality of meshes $M_i$ (i=1 to n), n being the number of meshes in a geographical area comprising at least one base station (4) broadcasting the CPC to the meshes $M_i$. The method comprises the following steps: calculating for each mesh $M_i$ a transmission power $P_i$; and broadcasting to each mesh $M_i$ the Cognitive Pilot Channel with the power $P_i$.

8 Claims, 1 Drawing Sheet

(56) References Cited

OTHER PUBLICATIONS

Siomina I., Yuan D, et al., "Pilot Power Management in WCDMA Networks: Coverage Control With Respect to Traffic Distribution", MSWiM '04, Oct. 4-6, 2004, pp. 276-282.

Perez-Romero, et al., A Novel On-Demand Cognitive Pilot Channel Enabling Dynamic Spectrum Allocation, 2007, 2nd IEEE International Symposium on Dynamic Spectrum Access Networks.

Office Action dated Jun. 10, 2014, issued by the State Intellectual Property Office of P.R. China in counterpart Application No. 201080020209.4.

* cited by examiner

METHOD FOR CONTROLLING THE POWER FOR BROADCASTING A COGNITIVE PILOT CHANNEL

TECHNICAL FIELD

The invention pertains to telecommunication field and concerns a method for controlling the power for broadcasting a Cognitive Pilot Channel transporting lists of information to a plurality of meshes $M_i$ (i=1 to n), n being the number of meshes in a geographical area comprising at least one base station transmitting said CPC to said meshes $M_i$ with a total transmission power P.

The invention also concerns a base station comprising means for broadcasting a Cognitive Pilot Channel to a plurality of meshes $M_i$ (i=1 to n) with a total transmission power P, n being the number of meshes in a geographical area, said Cognitive Pilot Channel transporting lists of information to said meshes to allow a User Equipment located in a given mesh $M_i$ (i=1 to n) to select an operator and/or a Radio Access Technology and/or a communication frequency available in said given mesh.

BACKGROUND ART

Cognitive Pilot Channel (CPC) is a concept used in cognitive radio to provide information to cognitive mobiles about the available operators, Radio Access Technologies (RAT) and Frequencies available in a geographical area.

Two Major concepts for Cognitive Pilot Channel are proposed by the E3 project and ETSI RRS Group: Mesh based and Optimised broadcast approach.

In mesh based concept, a cell in a geographical area is divided into a plurality of meshes and information is provided about operators, RATs and Frequencies available in each mesh.

In optimised broadcast concept, information about all the RATs and frequencies available in the cells is transmitted at once.

Although Mesh based concept is more precise than Optimised broadcast concept, it presents drawbacks resulting from the fact that the power used by the base station to broadcast said information is estimated to reach all mobiles. Thus no power control is used. The power is estimated at once to be sufficient for the users on the cell edge to be able to decode the broadcasted information.

Consequently, the same power is used for transmitting Cognitive Pilot Channel information to all meshes of the geographical area while the transmission of information to meshes close to the base station does not necessitate the same power as the transmission of said information to meshes situated on the outskirts of the geographical area. Thus a user equipment located in a peripheral mesh may not decode the information because of the power attenuation.

An object of the present invention is a method for optimizing the distribution of the transmission power in order to better control the power used to transmit the cognitive pilot channel (CPC) giving to a User Equipment the same probability of CPC content decoding in all the meshes.

Another object of the invention is a power control method that takes into account the attenuation du to the topography of each mesh in said geographical area.

SUMMARY OF INVENTION

Technical Problem

The invention is based on the fact that transmission of the Cognitive Pilot Channel content to meshes located near the base station requires less power than transmission of this content to meshes located at the periphery of the cell covered by the base station.

Thus, instead of transmitting the Cognitive Pilot Channel content with the same power to all the meshes of the geographical area, the power in the method according to the invention is distributed between said meshes to take into account the path loss that is likely to be seen by a user equipment in the geographical area.

Solution to Problem

This object is achieved by means of a method for controlling the power for broadcasting a Cognitive Pilot Channel (CPC) transporting lists of information to a plurality of meshes $M_i$ (i=1 to n), n being the number of meshes in a geographical area comprising at least one base station adapted for transmitting said CPC to said meshes $M_i$ with a total transmission power P.

The method according to the invention comprises the following steps:
  determining for each mesh $M_i$ (i=1 to n) the distance $d_i$ to said base station,
  calculating for each mesh $M_i$ (i=1 to n) a transmission power $P_i$ as a function of said distance $d_i$ and of said total transmission power P,
  broadcasting to each mesh $M_i$ (i=1 to n) said Cognitive Pilot Channel with the power $P_i$.

Preferably, said power $P_i$ is inversely proportional to said distance $d_i$.

According to a preferred embodiment of the invention, the calculated transmission power $P_i$ for a mesh $M_i$, (i=1 to n) is weighted by an attenuation parameter depending on the topography of said mesh $M_i$.

Said attenuation parameter is estimated when designing the CPC cell deployment and is stored in a look-up table.

With the method according to the invention, the probability of CPC detection is the same in all the meshes.

The invention is implemented by means of a base station comprising means for broadcasting a Cognitive Pilot Channel to a plurality of meshes $M_i$ (i=1 to n) with a total transmission power P, n being the number of meshes in a geographical area, said Cognitive Pilot Channel transporting lists of information to said meshes to allow a User Equipment (UE) located in a given mesh $M_i$ (i=1 to n) to select an operator and/or a Radio Access Technology and/or a communication frequency available in said given mesh $M_i$, said base station further comprises:
  means for determining for each mesh $M_i$ the distance $d_i$ to said base station,
  means for calculating for each mesh $M_i$ (i=1 to n) a transmission power $P_i$ as a function of said distance $d_i$ and of said total transmission power P,
  means for broadcasting to each mesh $M_i$ (i=1 to n) said Cognitive Pilot Channel with the power $P_i$.

The base station according to the invention further comprises means for weighting the calculated transmission power $P_i$ for a mesh $M_i$ (i=1 to n) by an attenuation parameter depending on the topography of said mesh $M_i$.

The forgoing summary, as well as the following detailed description, will be better understood when read in conjunction with the appended figures illustrating an exemplary embodiment of the invention as follows.

DESCRIPTION OF EMBODIMENTS

The invention will be described when implemented in a geographical area 2 covered by at least one wireless telecommunication network and in which a Cognitive Pilot Channel is used for broadcasting information on the available Radio Access technologies (RATs) and frequencies to allow cognitive receiver such as mobile phones, PDA, or laptops to choose the most convenient RAT and frequency for communicating in the network. Said geographical area is divided into a number n of contiguous elementary meshes 3.

Figure 1:
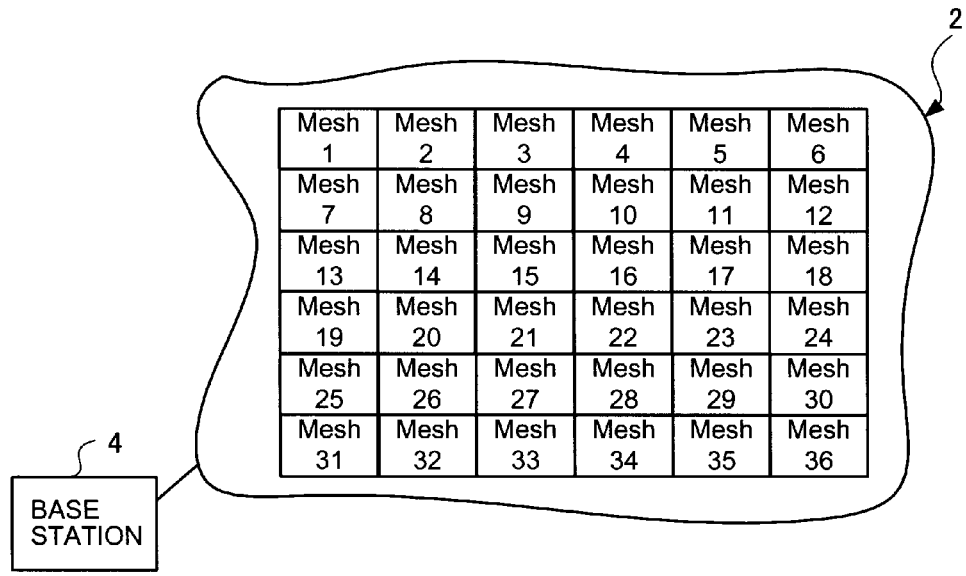
FIG. 1 schematically represents a geographical area comprising meshes in which the method according to the invention is implemented.

As illustrated by FIG. 1, the geographical area 2 is divided into n=36 (thirty six) contiguous elementary meshes covered by a base station 4 that broadcasts the Cognitive Pilot Channel (CPC) carrying lists of information on operators, Radio Access Technologies and radio frequencies available for each mesh $M_i$ (i=1 to 36).

The base station 4 comprises a processing module for estimating the path loss between the base station 4 and each mesh $M_i$ (i=1 to 36).

Said path loss is defined at the definition phase of cells and the cellular network deployment as a function of the distance between each mesh $M_i$ (i=1 to 36) and the base station 4 and as a function of the propagation environment.

The path loss calculated for each mesh $M_i$ (i=1 to 36) is stored with the corresponding mesh $M_i$ (i=1 to 36) in a look-up table 10 located in a storage module of the base station 4.

Figure 2:
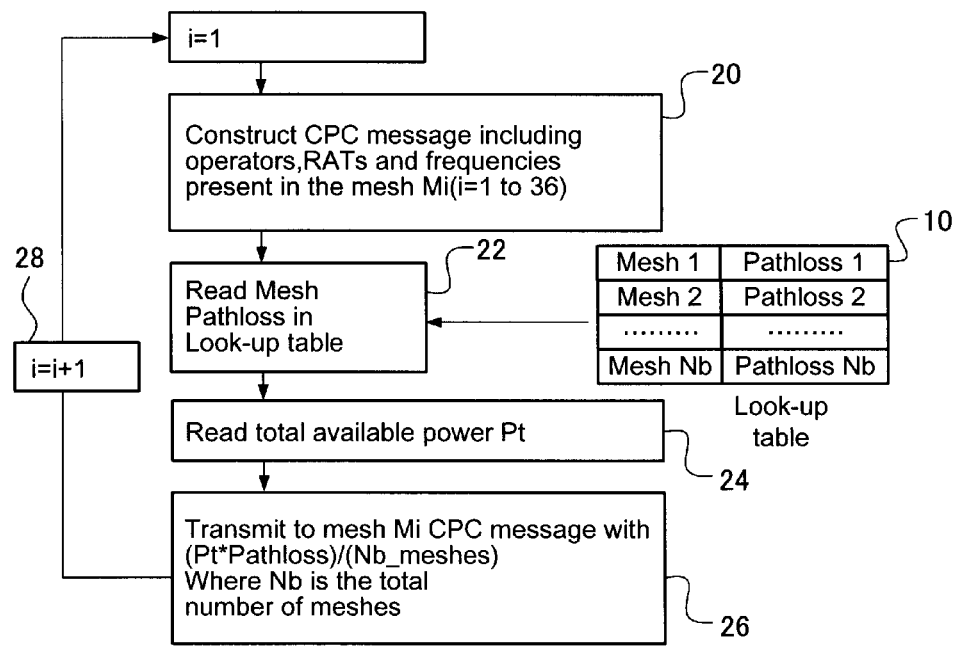
FIG. 2 is flow chart illustrating the steps of the method according to the invention.

FIG. 2 is a flow chart illustrating the steps of the method according to the invention.

At step 20, for each mesh $M_i$ (i=1 to 36) the processing module determine the list of information to broadcast in said mesh $M_i$.

At step 22, the processing module reads path loss for the mesh $M_i$ (i=1 to 36) from the look-up table 10.

At step 24, the processing module reads the total available power P and transmits, at step 26, the CPC message with a power given by the formula: $P_i$=P*Path loss/n, where n is the number of meshes (n=36 in the example of FIG. 1).

The processing module increments i at step 28 and re-runs the method from step 20 until all the meshes $M_i$ (i=1 to n) receive the appropriate information with the appropriate power $P_i$.

The invention claimed is:

1. A method for controlling the power for broadcasting a Cognitive Pilot Channel transporting lists of information to each of a plurality of meshes $M_i$ (i=1 to n), n being the number of meshes in a geographical area (2) including at least one base station broadcasting the Cognitive Pilot Channel to the meshes $M_i$ (i=1 to n), performed in the base station the method comprising:

calculating for each mesh $M_i$ (i=1 to n) a transmission power $P_i$; and broadcasting to each mesh $M_i$ (i=1 to n) the Cognitive Pilot Channel with the power $P_i$ from the base station, wherein each of powers $P_i$ (i=1 to n) is calculate as a function of a path loss between each mesh and the base station, and wherein the path loss is calculated as a function of distance $d_i$ between each mesh and the base station.

2. The method according to claim 1 wherein the power $P_i$ is inversely proportional to the distance $d_i$.

3. The method according to claim 2 wherein the power $P_i$ is calculated as a function of a total transmission power P.

4. The method according to claim 3 wherein the power $P_i$ is calculated by the following formula:

$Pi=P*\text{Path loss}/n$ where $n$ is the number of meshes.

5. The method according to claim 1 wherein the calculated transmission power Pi for a mesh $M_i$ (i=1 to n) is weighted by an attenuation parameter depending on the topography of the mesh $M_i$ (i=1 to n).

6. The method according to claim 5 wherein attenuation parameter is estimated when designing the CPC cell deployment and stored in a look-up table.

7. A base station comprising means for broadcasting a Cognitive Pilot Channel transporting lists of information to each of a plurality of meshes $M_i$ (i=1 to n), n being the number of meshes in a geographical area (2) including at least one base station broadcasting the Cognitive Pilot Channel to the meshes $M_i$ (i=1 to n), the base station further comprising:

calculation means for calculating for each mesh $M_i$ (i=1 to n) a transmission power $P_i$; and means for broadcasting to each mesh $M_i$ (i=1 to n) the Cognitive Pilot Channel with the power $P_i$, wherein the calculation means calculates each of powers $P_i$ (i=1 to n) as a function of a path loss between each mesh and the base station, and wherein the base station further comprises means for calculating the path loss as a function of distance $d_i$ between each mesh and the base station.

8. The base station according to claim 7 further comprising means for weighting the calculated transmission power $P_i$ for a mesh $M_i$ (i=1 to n) by an attenuation parameter depending on the topography of the mesh $M_i$.

* * * * *

UNITED STATES PATENT AND TRADEMARK OFFICE
CERTIFICATE OF CORRECTION

PATENT NO. : 8,880,064 B2
APPLICATION NO. : 13/318885
DATED : November 4, 2014
INVENTOR(S) : Belkacem Mouhouche Page 1 of 1

It is certified that error appears in the above-identified patent and that said Letters Patent is hereby corrected as shown below:

On the Title Page

Item (73) - Assignee: Delete "Nec" and insert -- NEC --

In the Specification

Column 1, Line 59: Delete "du" and insert -- due --

In the Claims

Column 4, Line 3: In Claim 1, delete "station" and insert -- station, --

Column 4, Line 9: In Claim 1, delete "calculate" and insert -- calculated --

Column 4, Line 20: In Claim 4, delete "Pi" and insert -- $P_i$ --

Column 4, Line 22: In Claim 5, delete "Pi" and insert -- $P_i$ --

Signed and Sealed this
Twenty-third Day of June, 2015

Michelle K. Lee
*Director of the United States Patent and Trademark Office*